(12) United States Patent
Iyer et al.

(10) Patent No.: US 10,372,657 B2
(45) Date of Patent: Aug. 6, 2019

(54) BIMODAL PHY FOR LOW LATENCY IN HIGH SPEED INTERCONNECTS

(71) Applicant: Intel Corporation, Santa Clara, CA (US)

(72) Inventors: Venkatraman Iyer, Round Rock, TX (US); William R. Halleck, Lancaster, MA (US); Rahul R. Shah, Marlborough, MA (US); Eric Lee, Windsor, CO (US)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 15/390,648

(22) Filed: Dec. 26, 2016

(65) Prior Publication Data
US 2018/0181525 A1   Jun. 28, 2018

(51) Int. Cl.
*G06F 13/00* (2006.01)
*G06F 13/40* (2006.01)
*G06F 13/42* (2006.01)
*G06F 13/16* (2006.01)
*G06F 13/38* (2006.01)

(52) U.S. Cl.
CPC ...... *G06F 13/4068* (2013.01); *G06F 13/1673* (2013.01); *G06F 13/1689* (2013.01); *G06F 13/382* (2013.01); *G06F 13/4282* (2013.01); *G06F 13/385* (2013.01); *G06F 2213/0026* (2013.01)

(58) Field of Classification Search
CPC ........................... G06F 13/4068; G06F 13/385
See application file for complete search history.

(56) References Cited

U.S. PATENT DOCUMENTS

| | | | | |
|---|---|---|---|---|
| 2002/0131365 | A1* | 9/2002 | Barker | H04L 47/10 370/235 |
| 2005/0030898 | A1* | 2/2005 | Furlong | H04L 41/00 370/236 |
| 2015/0117504 | A1* | 4/2015 | Harriman | G06F 13/385 375/224 |

* cited by examiner

*Primary Examiner* — Zachary K Huson
(74) *Attorney, Agent, or Firm* — Law Office of R. Alan Burnett, P.S

(57) ABSTRACT

Systems, methods, and apparatuses including a Physical layer (PHY) block coupled to a Media Access Control layer (MAC) block via a PHY/MAC interface. Each of the PHY and MAC blocks include a plurality of Physical Interface for PCI Express (PIPE) registers. The PHY/MAC interface includes a low pin count PIPE interface comprising a small set of wires coupled between the PHY block and the MAC block. The low pin count PIPE interface is configured to transfer register commands between the PHY and MAC blocks over the small set of wires in a time-multiplexed manner to support read and write access of the PHY and MAC PIPE registers. The PHY block may also be selectively configurable to implement a PIPE architecture when operating in a PIPE mode and a serialization and deserialization (SERDES) architecture when operating in a SERDES mode.

30 Claims, 14 Drawing Sheets

BIMODAL PHY FOR LOW LATENCY IN HIGH SPEED INTERCONNECTS

FIELD

This disclosure pertains to computing system, and in particular (but not exclusively) to point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

Like reference numbers and designations in the various drawings indicate like elements.

DETAILED DESCRIPTION

Figure 1:
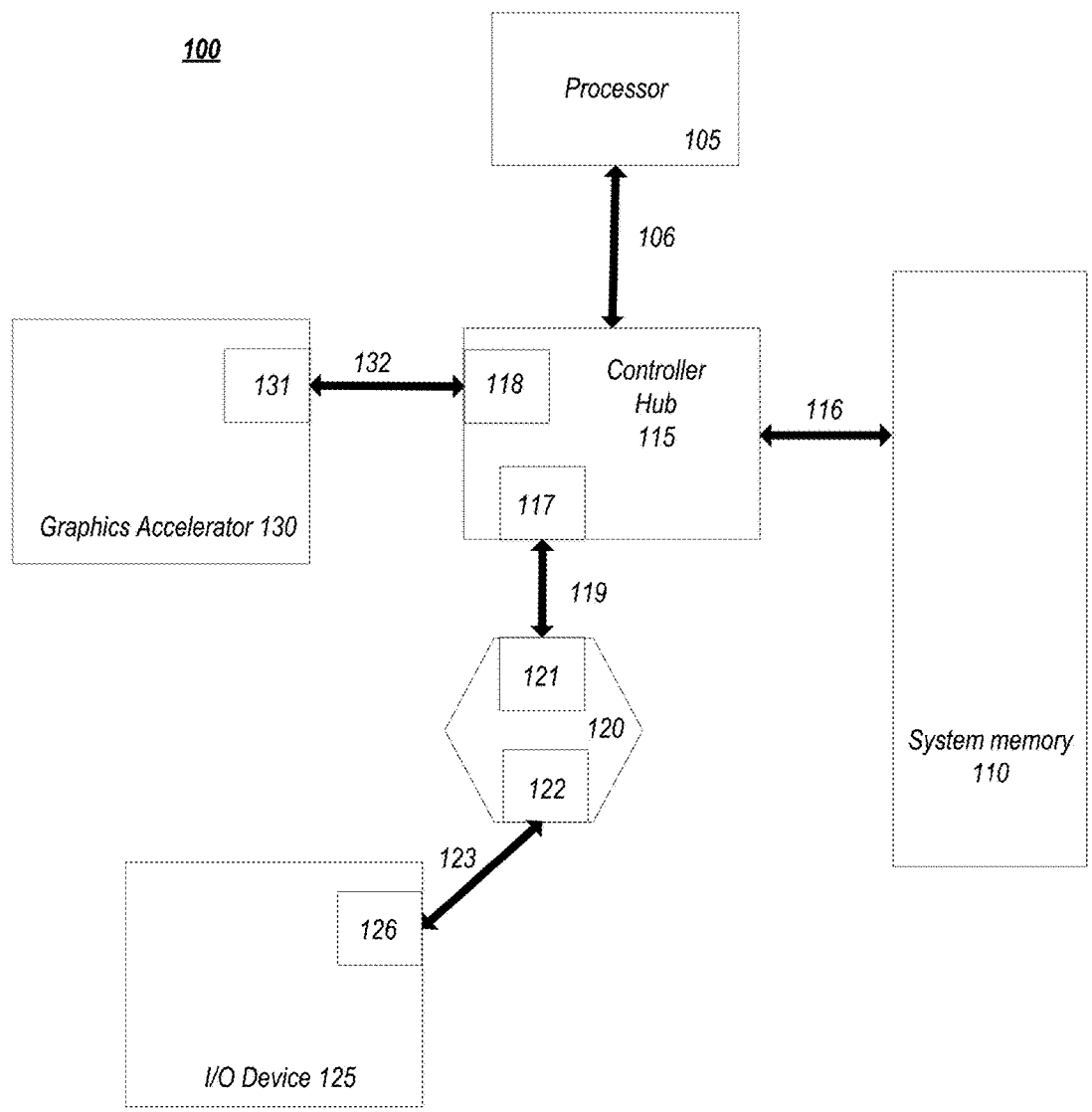
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
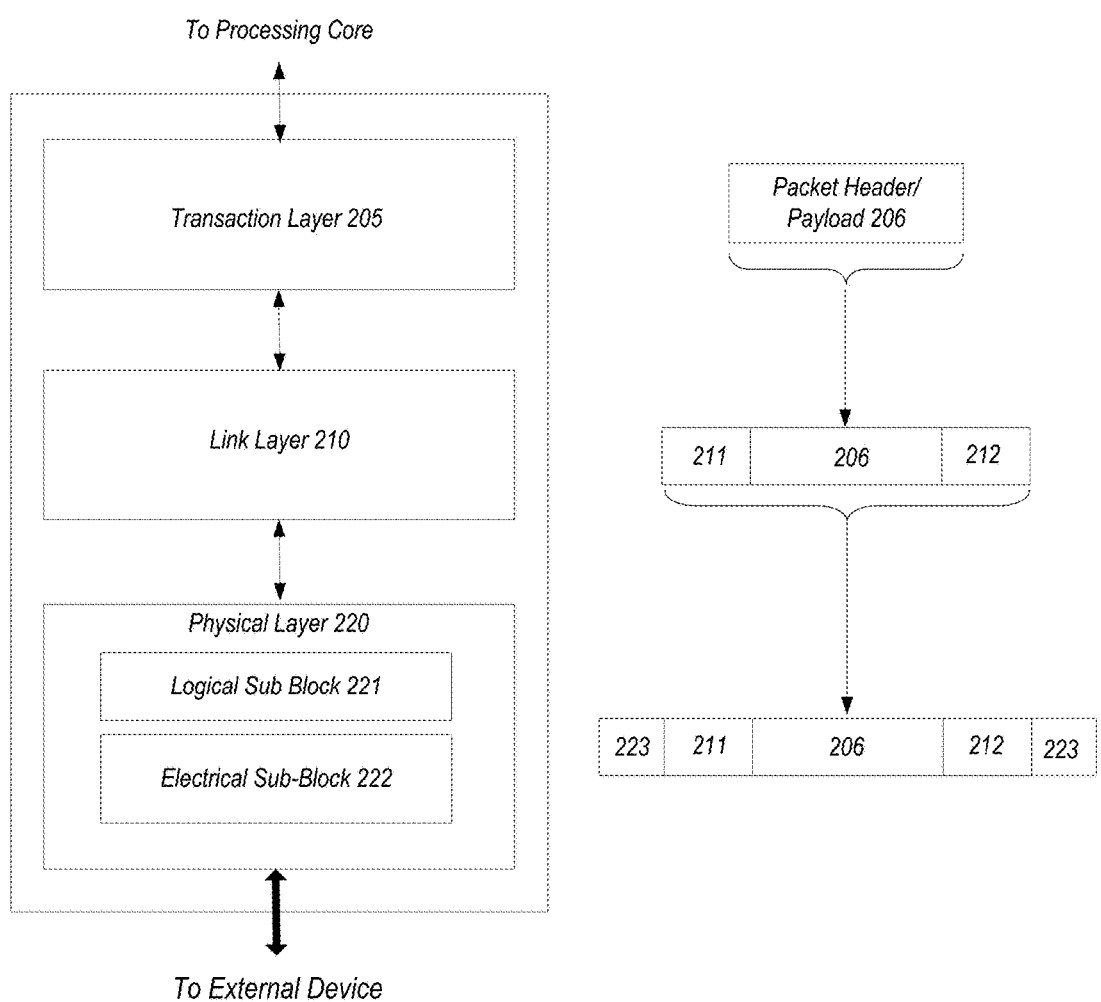
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCie stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
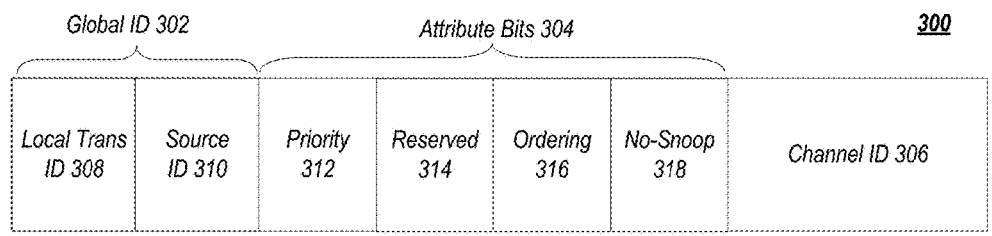
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes:

(1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
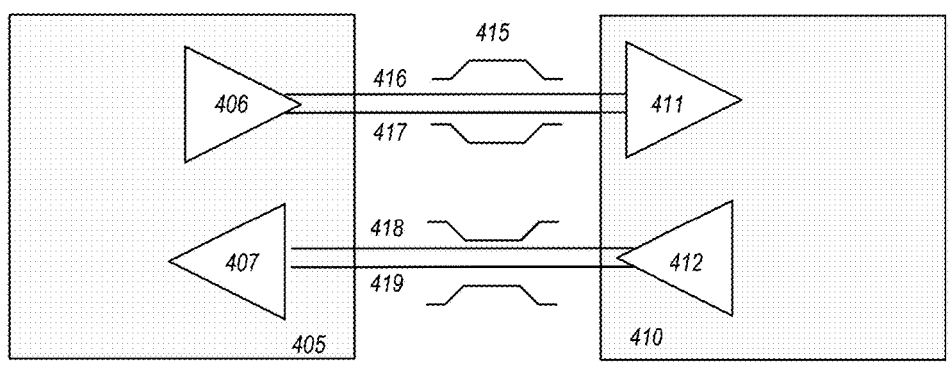
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In one embodiment, Ultra Path Interconnect (UPI) may be utilized to interconnect two or more devices. UPI can implement a next-generation cache-coherent, link-based interconnect. As one example, UPI may be utilized in high performance computing platforms, such as workstations or servers, including in systems where PCIe or another interconnect protocol is typically used to connect processors, accelerators, I/O devices, and the like. However, UPI is not so limited. Instead, UPI may be utilized in any of the systems or platforms described herein. Furthermore, the individual ideas developed may be applied to other interconnects and platforms, such as PCIe, MIPI, QPI, etc.

Figure 5:
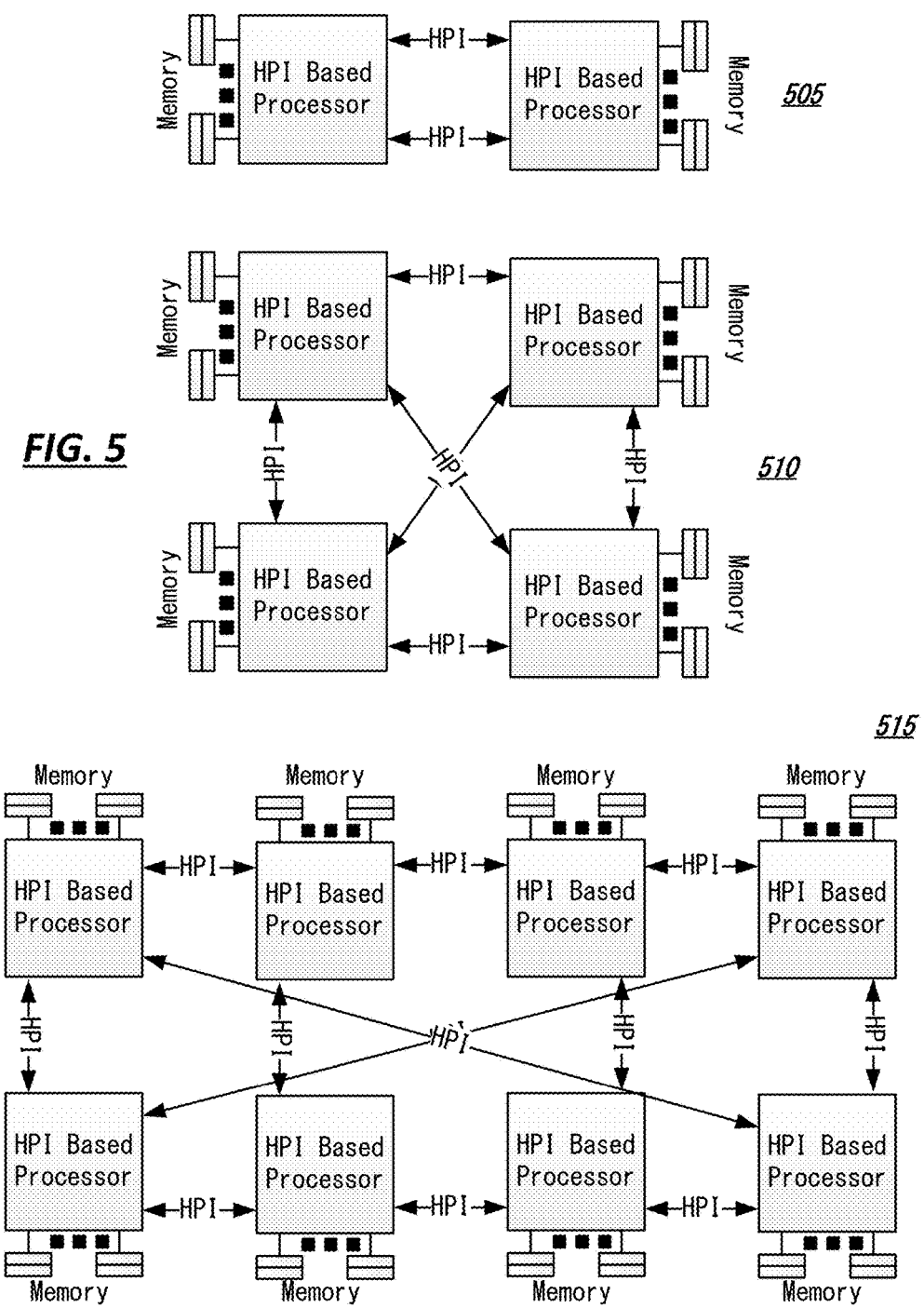
FIG. 5 illustrates embodiments of potential high performance interconnect system configurations.

To support multiple devices, in one example implementation, UPI can include an Instruction Set Architecture (ISA) agnostic (i.e. UPI is able to be implemented in multiple different devices). In another scenario, UPI may also be utilized to connect high performance I/O devices, not just processors or accelerators. For example, a high performance PCIe device may be coupled to UPI through an appropriate translation bridge (i.e. UPI to PCIe). Moreover, the UPI links may be utilized by many UPI based devices, such as processors, in various ways (e.g. stars, rings, meshes, etc.). FIG. 5 illustrates example implementations of multiple potential multi-socket configurations. A two-socket configuration 505, as depicted, can include two UPI links; however, in other implementations, one UPI link may be utilized. For larger topologies, any configuration may be utilized as long as an identifier (ID) is assignable and there is some form of virtual path, among other additional or substitute features. As shown, in one example, a four socket configuration 510 has an UPI link from each processor to another. But in the eight socket implementation shown in configuration 515, not every socket is directly connected to each other through an UPI link. However, if a virtual path or channel exists between the processors, the configuration is supported. A range of supported processors includes 2-32 in a native domain. Higher numbers of processors may be reached through use of multiple domains or other interconnects between node controllers, among other examples.

Figure 6:
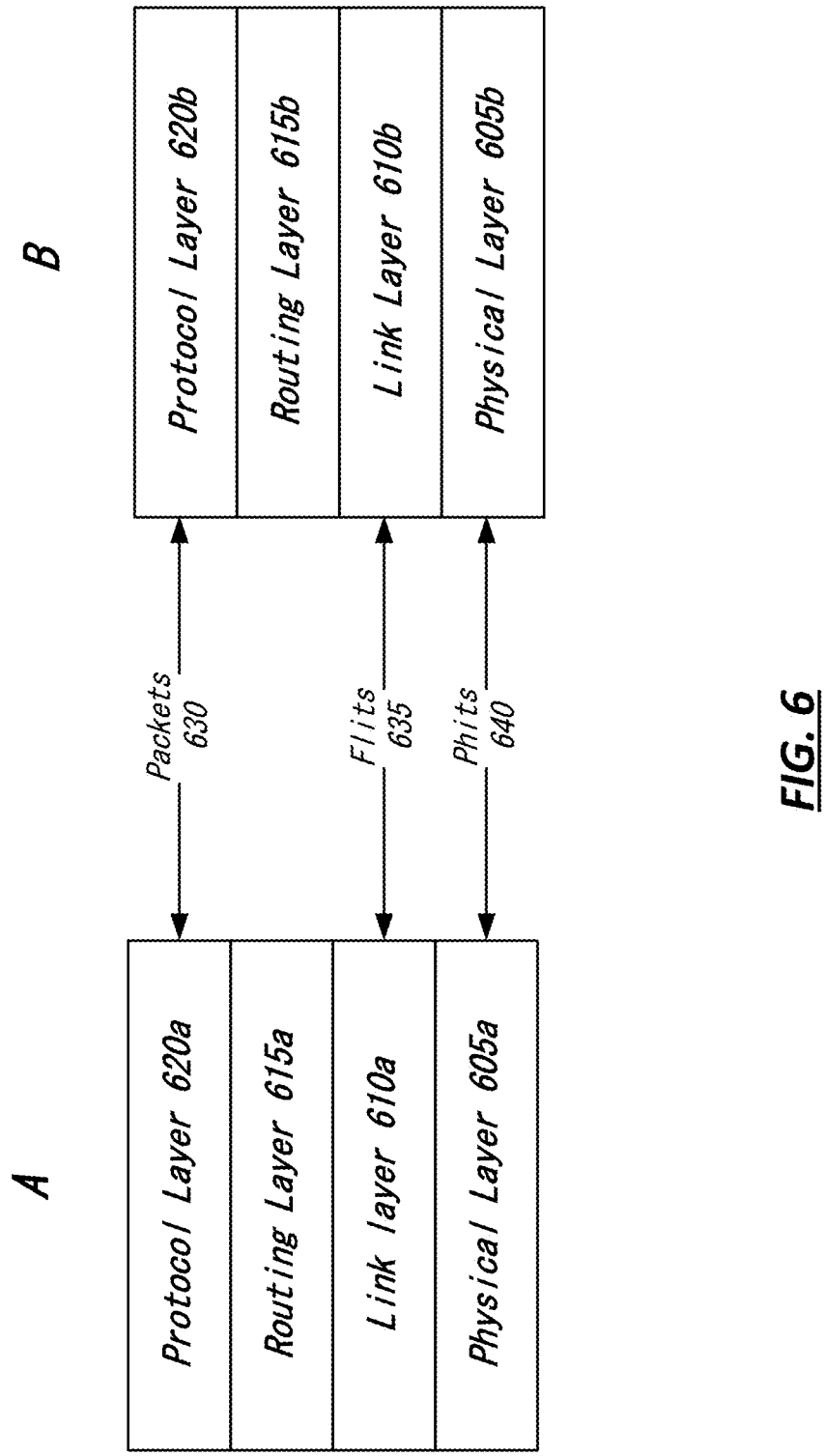
FIG. 6 illustrates an embodiment of an example layered protocol stack.

The UPI architecture includes a definition of a layered protocol architecture, including in some examples, protocol layers (coherent, non-coherent, and, optionally, other memory based protocols), a routing layer, a link layer, and a physical layer. Furthermore, UPI can further include enhancements related to power managers (such as power control units (PCUs)), design for test and debug (DFT), fault handling, registers, security, among other examples. FIG. 6 illustrates an embodiment of an example UPI layered protocol stack. In some implementations, at least some of the layers illustrated in FIG. 6 may be optional. Each layer deals with its own level of granularity or quantum of information (the protocol layer 620a,b with packets 630, link layer 610a,b with flits 635, and physical layer 605a,b with phits 640). Note that a packet, in some embodiments, may include partial flits, a single flit, or multiple flits based on the implementation.

As a first example, a width of a phit 640 includes a 1 to 1 mapping of link width to bits (e.g. 20 bit link width includes a phit of 20 bits, etc.). Flits may have a greater size, such as 184, 192, or 200 bits. Note that if phit 640 is 20 bits wide and the size of flit 635 is 184 bits then it takes a fractional number of phits 640 to transmit one flit 635 (e.g. 9.2 phits at 20 bits to transmit an 184 bit flit 635 or 9.6 at 20 bits to transmit a 192 bit flit, among other examples). Note that widths of the fundamental link at the physical layer may vary. For example, the number of lanes per direction may include 2, 4, 6, 8, 10, 12, 14, 16, 18, 20, 22, 24, etc. In one embodiment, link layer 610a,b is capable of embedding multiple pieces of different transactions in a single flit, and one or multiple headers (e.g. 1, 2, 3, 4) may be embedded within the flit. In one example, UPI splits the headers into corresponding slots to enable multiple messages in the flit destined for different nodes.

Physical layer 605a,b, in one embodiment, can be responsible for the fast transfer of information on the physical medium (electrical or optical etc.). The physical link can be point-to-point between two Link layer entities, such as layer 605a and 605b. The Link layer 610a,b can abstract the Physical layer 605a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 620a,b relies on the Link layer 610a,b to map protocol messages into the appropriate message classes and virtual channels before handing them to the Physical layer 605a,b for transfer across the physical links. Link layer 610a,b may support multiple messages, such as a request, snoop, response, writeback, non-coherent data, among other examples.

The Physical layer 605a,b (or PHY) of UPI can be implemented above the electrical layer (i.e. electrical conductors connecting two components) and below the link layer 610a,b, as illustrated in FIG. 6. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer 605a,b, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 610a,b can be implemented so as to provide reliable data transfer between two protocol or routing entities. The Link layer can abstract Physical layer 605a,b from the Protocol layer 620a,b, and can be responsible for the flow control between two protocol agents (A, B), and provide virtual channel services to the Protocol layer (Message Classes) and Routing layer (Virtual Networks). The interface between the Protocol layer 620a,b and the Link Layer 610a,b can typically be at the packet level. In one embodiment, the smallest transfer unit at the Link Layer is referred to as a flit which a specified number of bits, such as 192 bits or some other denomination. The Link Layer 610a,b relies on the Physical layer 605a,b to frame the Physical layer's 605a,b unit of transfer (phit) into the Link Layer's 610a,b unit of transfer (flit). In addition, the Link Layer 610a,b may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 615a,b can provide a flexible and distributed method to route UPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a UPI packet into the UPI fabric. The lookup at an intermediate router may be used to route an UPI packet from an input port to an output port. The lookup at a destination port may be used to target the destination UPI protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 615a,b relies on the Link layer 610a,b for providing the use of up to three (or more) virtual networks (VNs)—in one example, two deadlock-free VNs, VN0 and VN1 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In some implementations, UPI can utilize an embedded clock. A clock signal can be embedded in data transmitted using the interconnect. With the clock signal embedded in the data, distinct and dedicated clock lanes can be omitted. This can be useful, for instance, as it can allow more pins of a device to be dedicated to data transfer, particularly in systems where space for pins is at a premium.

A link can be established between two agents on either side of an interconnect. An agent sending data can be a local agent and the agent receiving the data can be a remote agent. State machines can be employed by both agents to manage various aspects of the link. In one embodiment, the Physical layer datapath can transmit flits from the link layer to the electrical front-end. The control path, in one implementation, includes a state machine (also referred to as a link training state machine or the similar). The state machine's actions and exits from states may depend on internal signals, timers, external signals or other information. In fact, some of the states, such as a few initialization states, may have timers to provide a timeout value to exit a state. Note that detect, in some embodiments, refers to detecting an event on both legs of a lane; but not necessarily simultaneously. However, in other embodiments, detect refers to detection of an event by an agent of reference. Debounce, as one example, refers to sustained assertion of a signal. In one embodiment, UPI supports operation in the event of non-function lanes. Here, lanes may be dropped at specific states.

Figure 7:
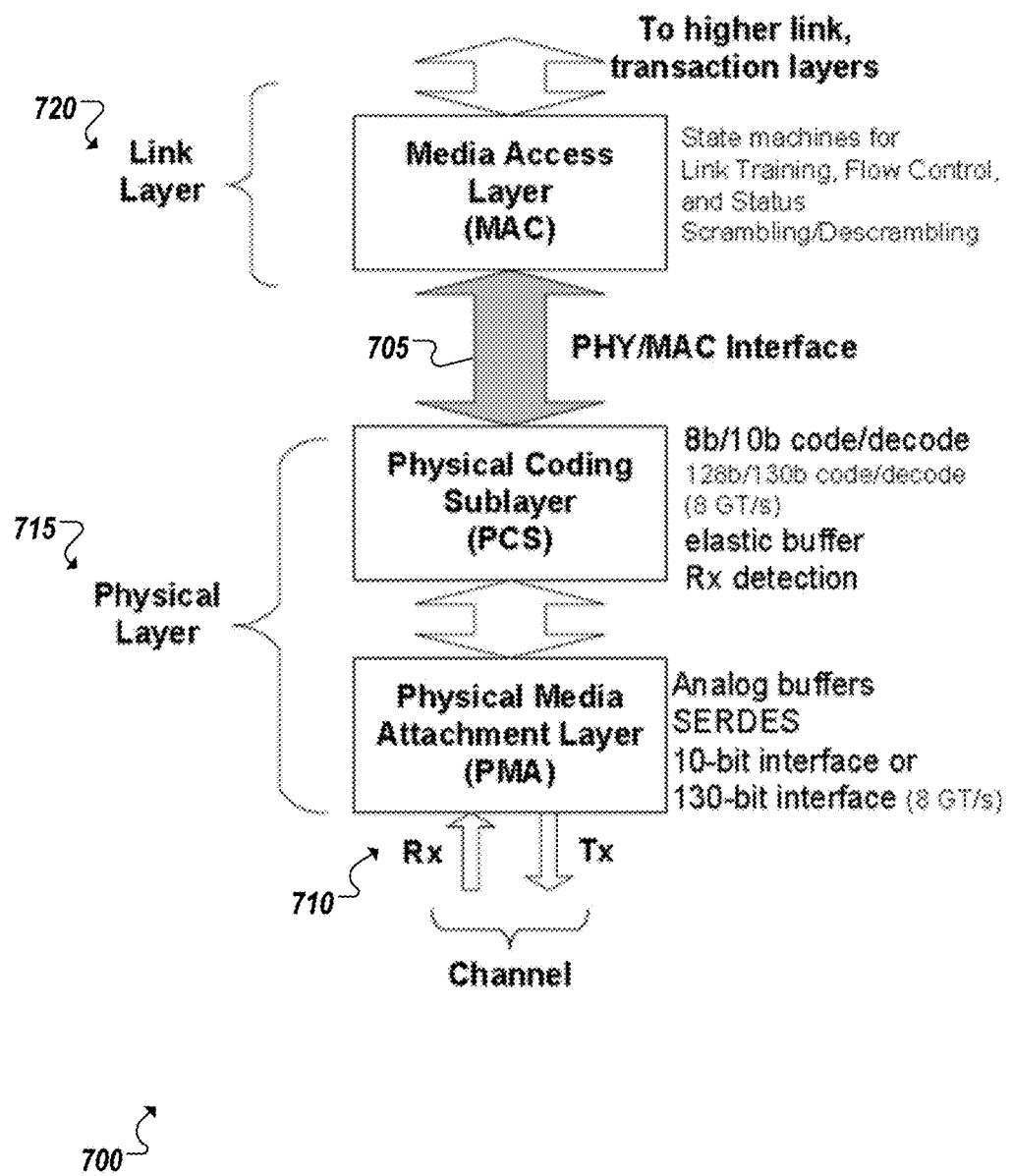
FIG. 7 illustrates a representation of a PHY/MAC interface.

FIG. 7 is a simplified block diagram 700 illustrating a defined interface 705 between a PHY and a MAC layer (e.g., implemented as two or more distinct computing blocks (or "IP blocks"). In this example, data transmitted or received over a physical channel 710 is processed by PHY layer logic 715. In one example, PHY layer logic 715 can include a physical media attachment (PMA) layer and a physical coding sublayer (PCS. The PMA can include analog buffers, a serializer/deserializer (SERDES) and an interface (to the channel 710) (e.g., a 10-bit or 130-bit interface), among other example logic and elements. The PCS can include coding/decoding logic (e.g., 8b/10b code/decode or 128b/130b code/decode), an elastic buffer, and receiver detection logic, among other example logic and elements. In this example, all or a portion of the PHY layer logic 715 can be embodied on a computing block separate from another computing block embodying all or a portion of link layer logic 720. Link layer logic 720 can include controller logic, such as a media access control (MAC) layer and interface with higher link and transaction layers in a protocol stack. In one example, the MAC layer can include state machines for link training, flow control, and status, scrambling and descrambling logic, among other example logic and elements. While the example of FIG. 7 shows the MAC layer as part of the link layer, in other implementations, the MAC layer (or other controller layer) may be a part of the logical PHY layer and a register-based interface (adopting at least some of the features described herein) can connect the logical PHY to the analog or physical PHY, among other examples.

A defined interface between a controller and PHY can attempt to define a standardized interface between the controller and PHY including the definition of control and status signals for transmission between the computing blocks implementing the controller and PHY in connection with management of the interface and support of one or more interconnect protocols on a link. For instance, PIPE defines an interface between a MAC and PHY using dedicated control and status signal wires for each operation involving communication between the MAC and the PHY. The number of PIPE signals has grown over time as each of the protocol specifications PIPE supports (e.g. PCIe, SATA, USB) evolves (and as additional protocols are added for support through PIPE). Indeed, recent work on PIPE has attempted to add support for USB Type-C, which includes support for Displayport, Thunderbolt, and configurable Rx/Tx lane pairs, among other examples. Such improvements, however, would result in a significant increase of the signal wire (and pin) count of the PIPE interface using the current scheme of dedicated signals for each operation. Indeed, the traditional PIPE interface is reaching a point where the escalating pin count threatens its future scalability and usability.

The present Specification presents features and example implementations that address at least some of the issues above. For instance, in one example, escalating signal and pin count of a defined MAC-PHY can be addressed by providing a low pin count version of the defined interface (e.g., a PIPE interface) through the utilization of a register-based status and control interface. In some example interfaces, a set of datapath signals and control and status signals can be defined. For instance, the current PIPE interface defines datapath signals and control and status signals per Rx/Tx lane pair (and other interfaces may additionally support configurable pairs where pairs are configured either as {Rx, Tx}, {Rx, Rx}, {Tx, Tx} or {Tx, Rx}, etc.). As new signals are added to the interface definition, this may result in additional pins being provided to accommodate the new signals. In one embodiment, a low pin count version of a traditional PIPE interface can be implemented, for instance, by providing an interface that maintains dedicated wires for datapath signals, asynchronous control and status signals, and latency-sensitive control and status signals, but that maps remaining control and status signals defined for the interface to registers (e.g. 8-bit, 16-bit, or 32-bit registers), which can be accessed over a small number of additional pins/wires, such as wires facilitating data transmission of 4-bits, 8-bits, etc. per direction. To support messaging of these control and status signals using the registers, an address space can be provided (e.g., 12 address bits), into which the defined registers are mapped. In some implementations, this address space can be designed to be deliberately large to accommodate expansion of the set of operations, control and status signals, that are to use these defined registers. This allows plenty of headroom for future expansion as well as room to house vendor-specific registers that PHY designs can use to expose useful status information to the controller or to provide additional configurability.

Continuing with the above example, to facilitate messaging of these control and status signals using the registers, read, write, completion, and other commands may be newly defined for accessing the registers. Included is a mechanism for grouping multiple writes together so that they take effect in the same cycle. Included is also a mechanism for distinguishing between 1-cycle assertion type signals and signals that are held to a constant value. A transaction involving these registers may include command, address, and data or any subset of these three elements, which may be transferred over the small set of wires in a time multiplexed manner (e.g., over multiple unit intervals or clock cycles). A framing scheme can also be defined in connection with the interface, by which a corresponding computing block may identify boundaries (e.g., start and end) of potentially multiple sequential (or contemporaneous) register transactions, each transaction serving to communicate one or more control or status signals in lieu of these same signals being driven over dedicated wires, as is done, for instance, in traditional PIPE interfaces, among other example features.

As introduced above, some implementations of an improved MAC-PHY interface can enable a defined interface to be extended to support complicated and large signal sets (e.g., such as when extending PIPE specification support for USB Type-C), while at the same time reducing the interface's signal and pin count. To illustrate, the current PIPE interface signal count would roughly need to double to support Type-C configurable pairs, which would make PIPE compliant Type-C designs very challenging to implement from a physical design point of view. An improved interface design, which offloads some signals, previously using dedicated wires, to specialized registers, may also provide the ability to enable more interface operations in the future, as the protocols supported by the interface (e.g., PIPE) evolve to add new features, all while saving the interface from further increases in interface signal count.

Figure 8:
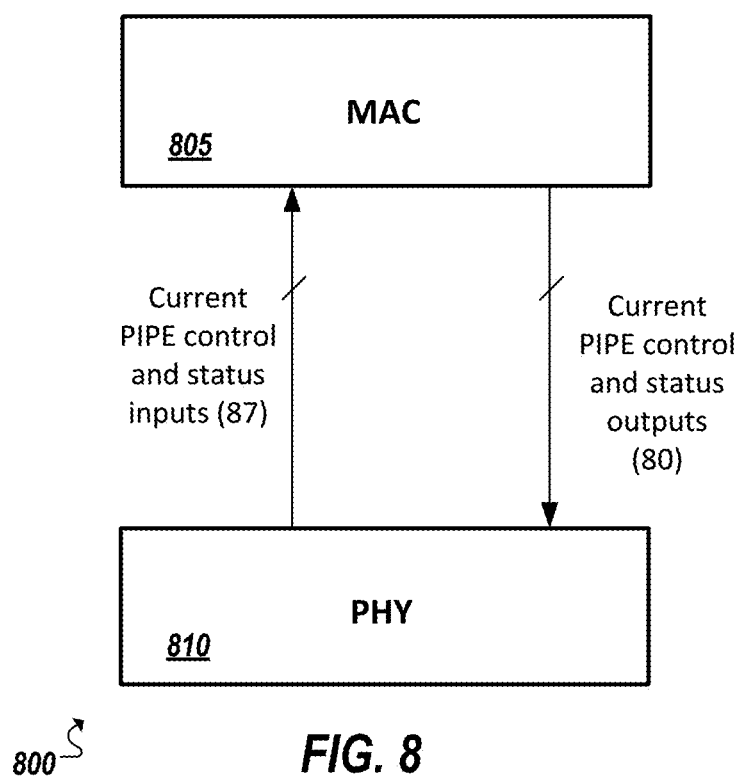
FIG. 8 illustrates a representation of a first version of a PIPE PHY/MAC interface.

Turning to FIG. 8, a simplified block diagram 800 is shown of a conventional PIPE interface coupling a MAC computing block 605 with a PHY computing block 810. The interface can include a control and status interface (for control and status signaling) with roughly 67 control and status inputs and 80 control and status outputs per lane (i.e., Rx/Tx pair). As such an interface implementing a multi-lane design would replicate each of these signals per lane, potentially resulting in exponential growth of the overall pin count dedicated to supporting this control and status interface.

Figure 9:
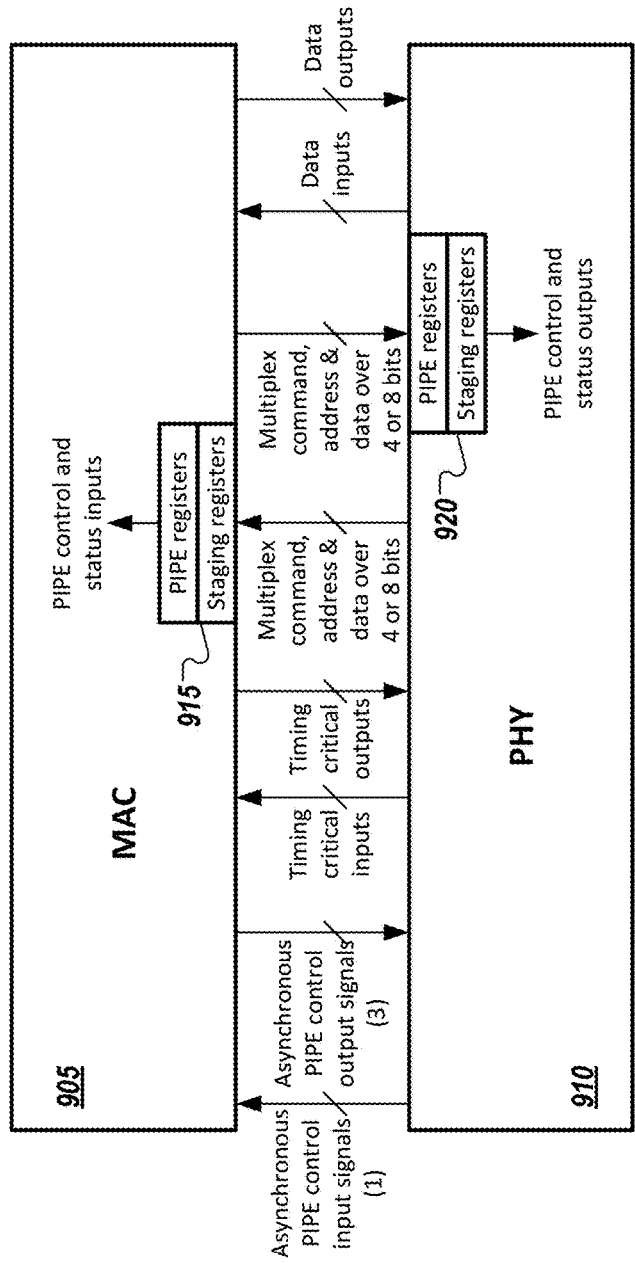
FIG. 9 illustrates a representation of a second, register-based version of a PIPE PHY/MAC interface.

Turning to FIG. 9, a simplified block diagram 900 is shown of an improved PIPE interface utilizing a register-based, low pin count PIPE control and status interface. The interface is adapted for coupling a MAC computing block 905 with a PHY computing block 910. In one example, subsets of the control and status signals defined for the interface can be categorized as either asynchronous signals, timing critical signals, and regular control and status signals. The asynchronous and timing critical control and status signals may be assigned dedicated wires on the improved interface, such as shown in FIG. 9. The regular control and status signals, however, may be mapped into and replaced by the bits of registers (e.g., 915, 920), which are accessed over a small set of wires (e.g. four or eight bits) as shown in the present example. Register commands, e.g. reads and writes, register address, and register data may be transmitted in a time-multiplexed manner across this small serial interface. Further, the datapath related signals of the interface may be separate from the control and status signals and may, in effect, be the same or very similar to those provided in conventional interface implementations (e.g., traditional PIPE interfaces).

For a high speed interconnect lane, the physical layer is implemented as a pair of analog PHY (PHY) and the logical PHY (or MAC). The interface between PHY and MAC is often the standard interface called PIPE. The PHY (e.g. MG PHY) is typically a hard IP and common to various protocols (e.g. UPI, PCIe, USB) whereas the MAC is a SIP which is specific to the protocol. In some cases two or more MACs may be muxed to use the same PHY.

In the Rx direction, the data has to be moved from the Rx recovered clock domain to the PHY clock domain and then to the MAC clock domain. At high speeds, the clock periods are very short (e.g. UPI PHY/MAC period is 62.5 ps at 16 Gbs) and synchronizing the data transfer during domain crossing becomes challenging. One approach is to use drift buffers at every domain crossing (aka PIPE mode) but this adds latency which hurts performance of multi-socket systems. An alternate approach is to pass data along with recovered clock directly from the recovered clock domain to the MAC clock domain (aka SERDES mode).

It is desirable to have a PHY which can work in either mode so different MACs could be muxed/demuxed to the PHY. The SERDES mode PHY does alignment of the deserialized data, e.g., to half-symbol boundaries, in the recovered clock domain. The PIPE mode PHY uses an elastic/drift buffer to cross the deserialized data from recovered clock domain to PHY clock domain [RG1]. This disclosure describes muxing the aligned data to the output stage of drift buffer and muxes the recovered clock to this stage.

Figure 10:
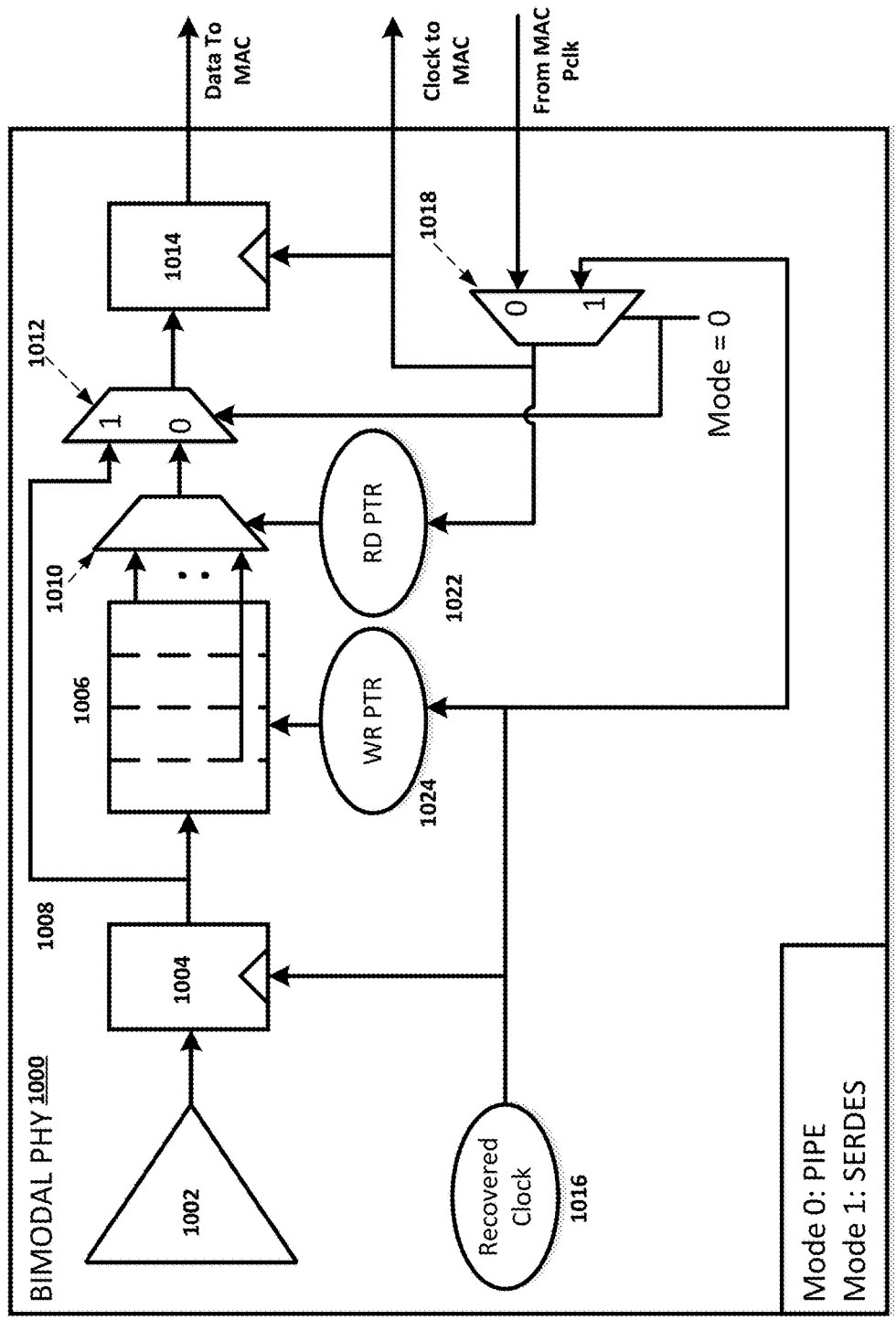
FIG. 10 is a schematic diagram of an example bimodal PHY in accordance with embodiments of the present disclosure.

FIG. 10 is a schematic diagram of an example bimodal PHY 1000 in accordance with embodiments of the present disclosure. PHY 1000 can receive data into a receiver 1002. Receiver 1002 is electrically connected to a latch circuit 1004. The output of the latch circuit 1004 is branched. A first branch sends the received data to a drift buffer 1006. Drift buffer 1006 can be an elastic buffer or other type of temporary storage device. The output of the drift buffer 1006 is connected to a drift buffer read multiplexer (MUX) 1010. The drift buffer read MUX 1010 has an output connected to a bypass MUX 1012.

The second branch is a bypass branch 1008. The bypass branch 1008 is input into the bypass MUX 1012. The output of the bypass MUX 1012 is connected to an output staging flop 1014.

Biomodal PHY 1000 also includes a clocking MUX 1018. The clocking MUX 1018 has a first input as a Pclk from the MAC and has a second input as the recovered clock 1016 from the received data. The recovered clock is also input into the latch circuit 1004 and the write pointer (WR PTR) 1024. The output of the clocking MUX is coupled to the read pointer (RD PTR) 1022 for the drift buffer read MUX 1010 and to the output staging flop 1014. In addition, the output of the clocking MUX is coupled to one or more circuit elements of the MAC (described in more detail in FIGS. 11A-11B).

Figure 11A:
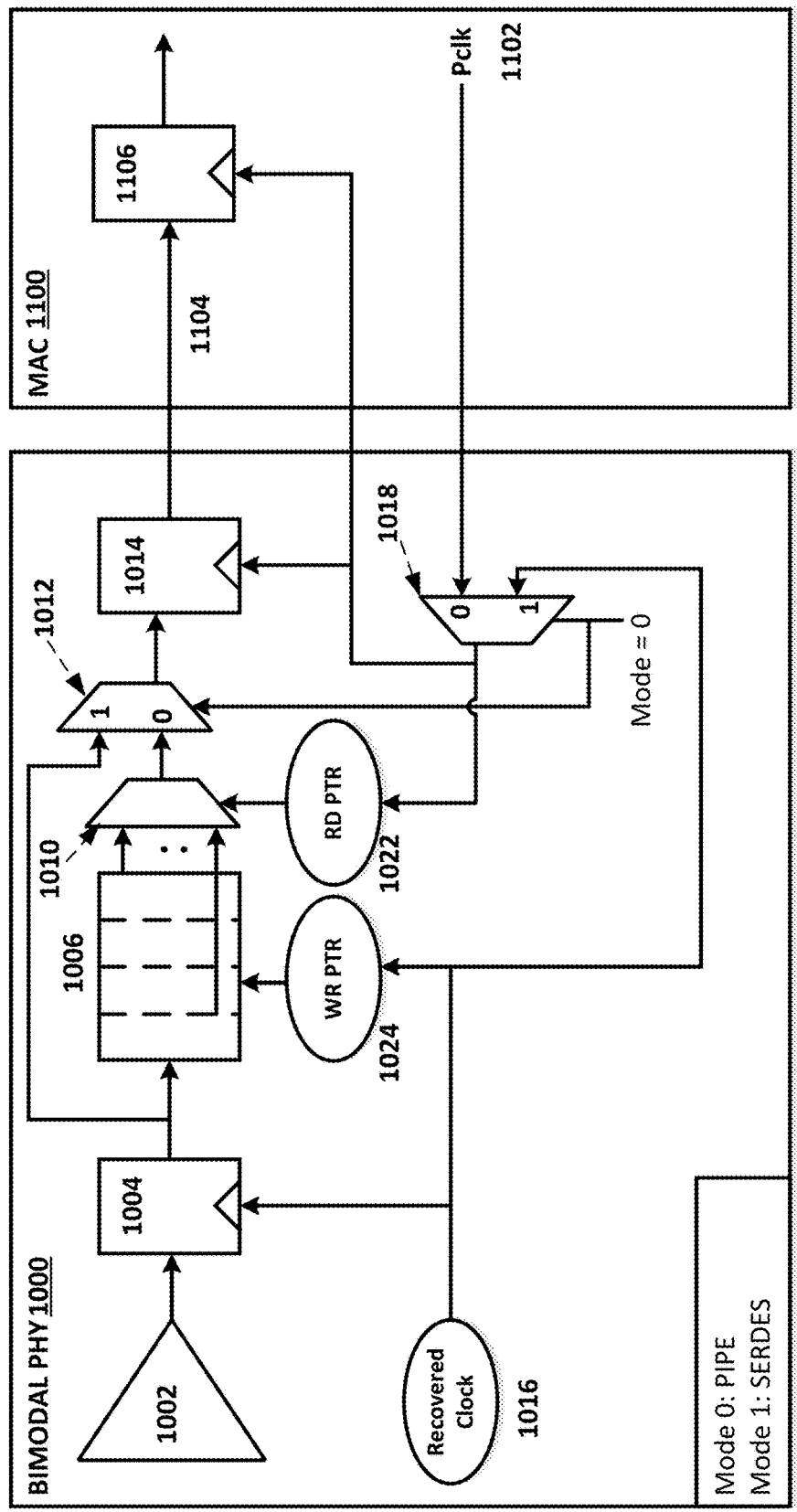
FIG. 11A is a schematic diagram of a data reception path for a PIPE mode PHY/MAC interface in accordance with embodiments of the present disclosure.

The clocking MUX 1018 is controlled by a binary input that sets a Mode of the biomodal PHY 1000. In this example, Mode 0 corresponds to PIPE mode of operation, while Mode 1 corresponds to SERDES operating mode. The binary input is also provided to the bypass MUX 1012, the control of which is linked to the Mode of operation. Each operating mode is also described in more detail in FIGS. 11A-11B:

FIG. 11A is a schematic diagram of a data reception path for a PIPE mode PHY/MAC interface in accordance with embodiments of the present disclosure. Bimodal PHY 1000 is connected to a PIPE compliant MAC 1100. The binary input to the clocking MUX 1018 is set to 0 for PIPE mode of operation. The binary input (0) is also set at the bypass MUX 1012.

As mentioned previously, the recovered clock 1016 is coupled to an input of the clocking MUX 1012 and the MAC Pclk 1102 is coupled to another input of the clocking MUX 1012. More specifically, the recovered clock 1016 is tied to an input that is selected by a 1 bit; while the Pclk is tied to an input that is selected by a 0 bit. For PIPE operation, the 0 bit is set, which means that the Pclk will be selected. The Pclk signal is output from the clocking MUX 1018 and provided to the RD PTR 1022 for the drift buffer read MUX, the output staging flop 1014, and the MAC pipeline flop 1106.

The binary input (0 for PIPE) is set at the bypass MUX 1012. The output of the drift buffer read MUX is coupled to an input on the bypass MUX 1012 selected by a 0 control bit. (The bypass branch 1008 is tied to the input of the bypass MUX 1012 selected by the 1 control bit.) When the data reaches the bypass MUX 1012 from the drift buffer 1006, the data will be output from the bypass MUX 1012 to the output staging flow 1014.

The output stage flop 1014 is read using the Pclk from the clocking MUX 1018 to output the data to the MAC via an interface 1104 to a MAC pipeline flop 1106.

Figure 11B:
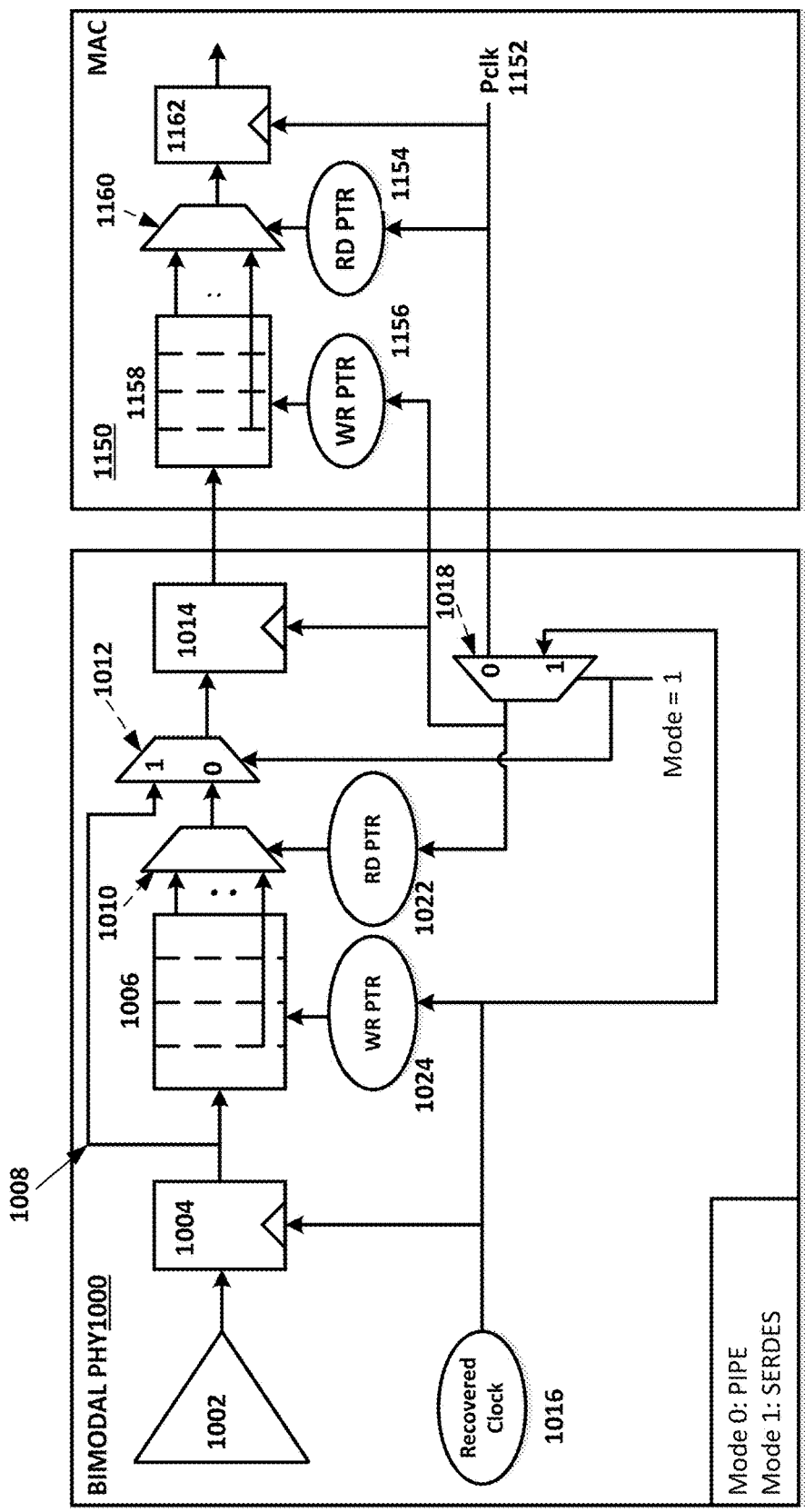
FIG. 11B is a schematic diagram of a data reception path for a SERDES mode PHY/MAC in accordance with embodiments of the present disclosure.

FIG. 11B is a schematic diagram of a data reception path for a SERDES mode PHY/MAC in accordance with embodiments of the present disclosure. In FIG. 11B, the bimodal PHY 1000 is coupled to a SERDES compliant MAC 1150. The SERDES compliant MAC 1150 includes a Pclk 1152 coupled to a read pointer (RD PTR) 1154 and to the 0 selection input of the clocking MUX 1018. The SERDES compliant MAC 1150 also includes a drift buffer 1158 that has a WR PTR 1156 coupled to the output of the clocking MUX 1018. The drift buffer 1158 outputs to a drift buffer read MUX 1160, which outputs to a MAC output staging flop 1162.

The binary input for the clocking MUX 1018 is set to 1 for SERDES operation, which selects the recovered clock signal from recovered clock 1016 as the output of the clocking MUX 1018. The clocking MUX signal is coupled to the RD PTR of the PHY drift buffer read MUX 1010, to the output staging flop 1014, and to the write pointer (WR PTR) 1156 of the MAC 1150.

The binary input for the bypass MUX 1012 is also set to 1 for SERDES operation. As mentioned above, the bypass branch 1008 is coupled to the bypass MUX 1012. More specifically, the bypass branch 1008 is coupled to the 1 selectable input for the bypass MUX 1012, so that when the binary input to bypass MUX 1012 is set to 1, the bypass MUX 1012 outputs the data from the bypass branch 1008, thereby bypassing the PHY drift buffer 1006. When the data reaches the bypass MUX 1012 from the bypass branch 1008, the data will be output from the bypass MUX 1012 to the output staging flow 1014.

The data is input into the MAC drift buffer 1158. The recovered clock signal is provided to the WR PTR 1156 by the clocking MUX 1018, and the recovered clock signal is used to write the data into the MAC drift buffer 1158. The data is read into a drift buffer Read MUX 1160 by a RD PTR 1154 that uses the Pclk signal from Pclk 1152. The data is read out into a MAC output staging flop 1162, which is also aligned to the Pclk 1152.

Figure 12:
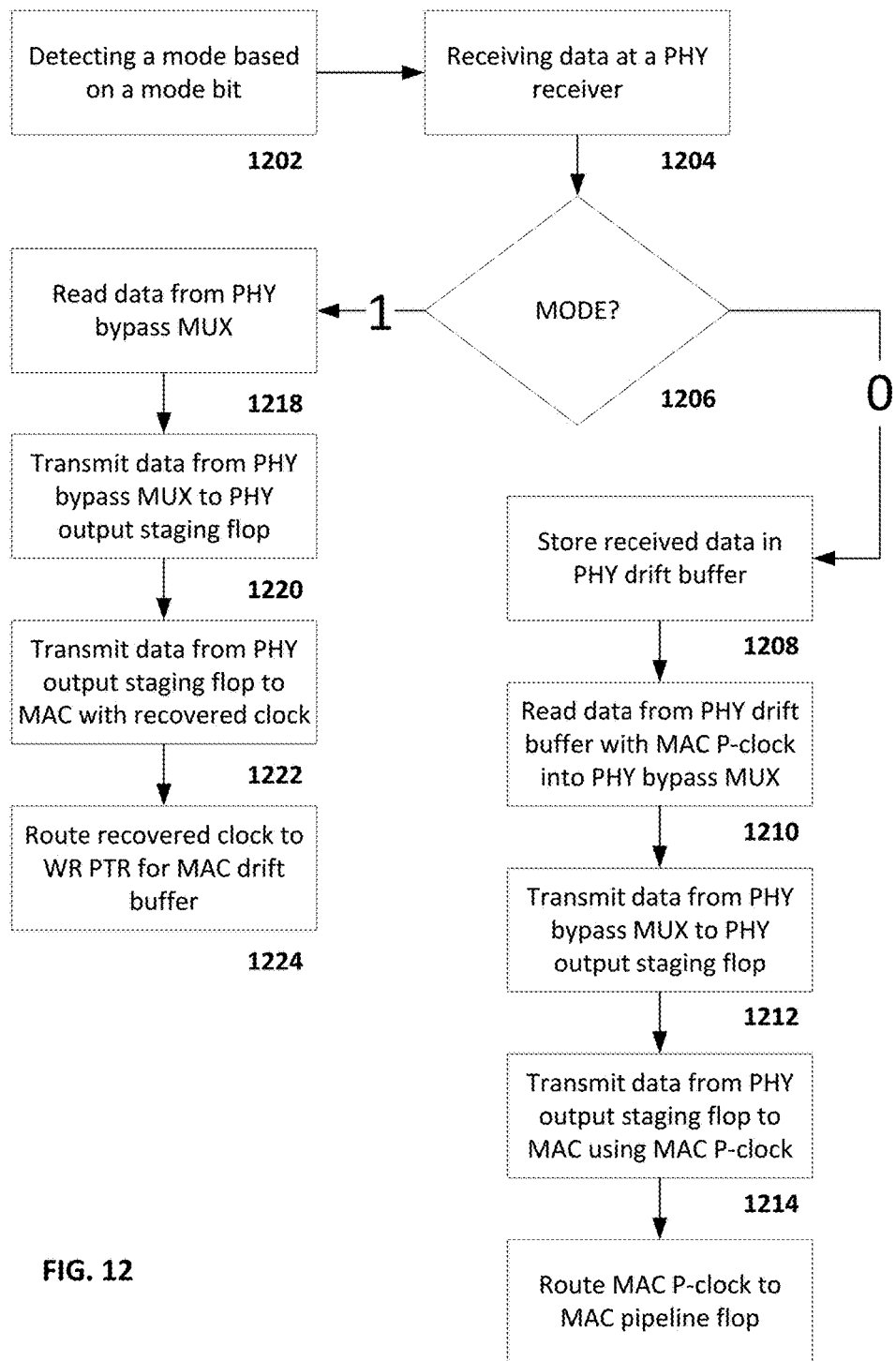
FIG. 12 is a process flow diagram for a bimodal PHY in accordance with embodiments of the present disclosure.

FIG. 12 is a process flow diagram 1200 for a bimodal PHY in accordance with embodiments of the present disclosure. At the outset, a mode bit is set to 0 for PIPE operation or 1 for SERDES operation (1202). The actual bit assignment is a design choice, and the values provided here are for example purposes. Data is received at a PHY receiver (1204). The process flow chart 1200 includes a determination about which mode is set (1206); however, the mode is set prior to operation and no such decision is actually performed. Rather, the electrical elements will perform operations based on the value of the bit set, as described above.

For a 0 bit set, the process flow 1200 follows the PIPE mode of operation in this example. The data that is received is stored in a PHY drift buffer (1208). The data is read from the drift buffer by a Pclk signal from a clocking MUX (1210). The data is read into a bypass MUX. The bypass MUX is set to output the data form the drift buffer input based on the 0 bit being set. The bypass MUX outputs the data towards the MAC (e.g., through an output staging flop) (1214). The output staging flop uses the Pclk signal from the clocking MUX. The clocking MUX can provide the Pclk signal to one or more elements in the MAC, such as a MAC pipeline flop (1216). The routing of the Pclk to the MAC is done once the 0 bit is set and the system is turned on; the routing does not need to wait till after data is sent to the MAC. More generally, the order of operations is not implied by the order of the process flow chart because some operations are occurring coincidentally with the routing of data through the circuitry.

For a 1 bit set, the process flow 1200 follows the SERDES mode of operation in this example. The data is routed through a bypass branch to the bypass MUX, which is set by the 1 bit to output the data from the bypass branch (1218). The bypass MUX outputs the data towards the MAC (e.g., through an output staging flop) (1220). The output staging flop outputs the data to the SERDES compliant MAC using the recovered clock signal from the clocking MUX (1222). The MAC stores the data in a MAC drift buffer. The recovered clock signal is provided to one or more elements in the MAC from the clocking MUX (1224). For example, the MAC drift buffer can be written by a WR PTR that uses the recovered clock signal from the clocking MUX. The routing of the recovered clock to the MAC is done once the 1 bit is set and the system is turned on; the routing does not need to wait till after data is sent to the MAC. More generally, the order of operations is not implied by the order of the process flow chart because some operations are occurring coincidentally with the routing of data through the circuitry.

Figure 13:
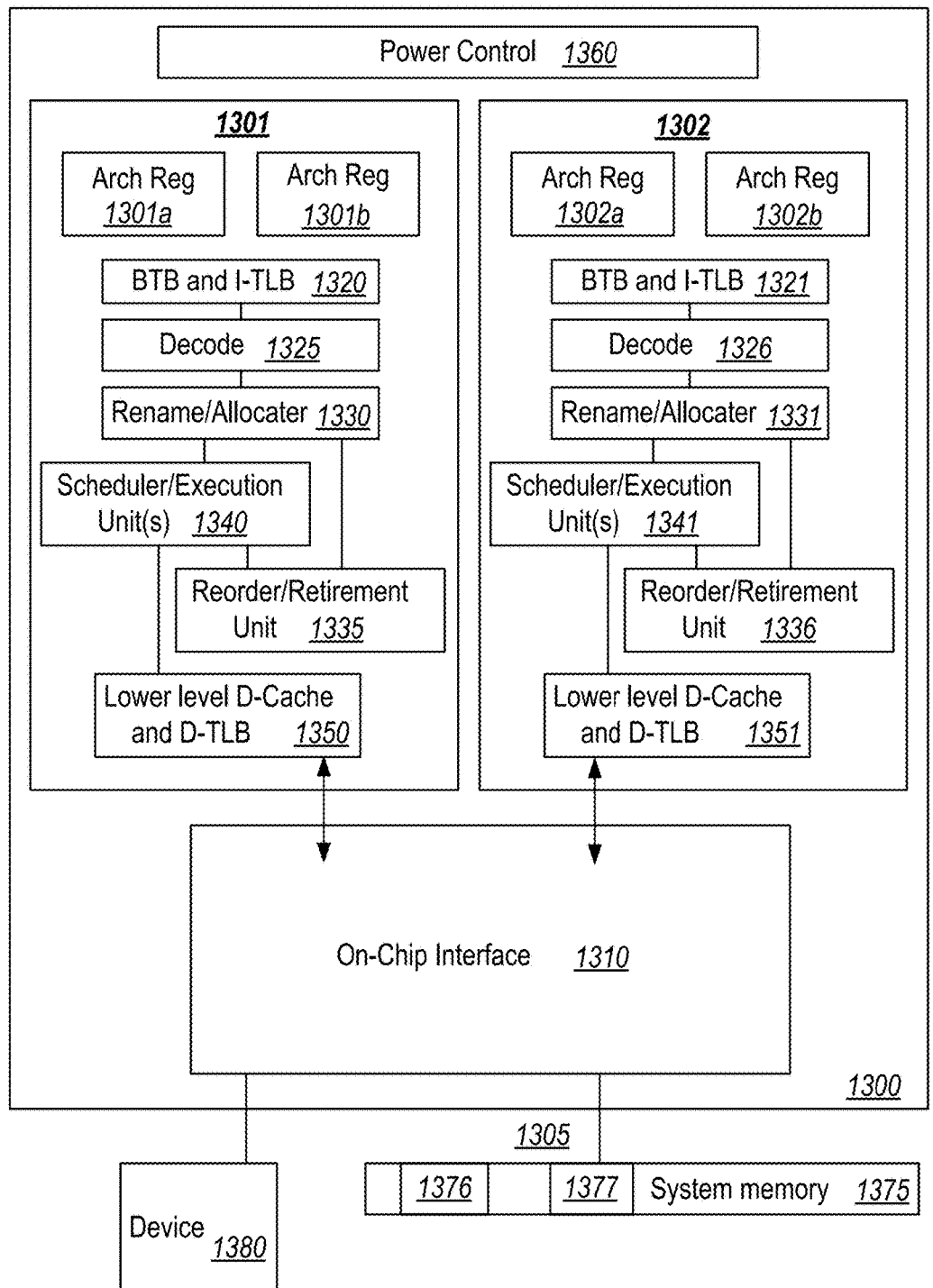
FIG. 13 illustrates an embodiment of a block diagram for a computing system including a multicore processor.

Referring to FIG. 13, an embodiment of a block diagram for a computing system including a multicore processor is depicted. Processor 1300 includes any processor or processing device, such as a microprocessor, an embedded processor, a digital signal processor (DSP), a network processor, a handheld processor, an application processor, a co-processor, a system on a chip (SOC), or other device to execute code. Processor 1300, in one embodiment, includes at least two cores—core 1301 and 1302, which may include asymmetric cores or symmetric cores (the illustrated embodiment). However, processor 1300 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1300, as illustrated in FIG. 13, includes two cores—core 1301 and 1302. Here, core 1301 and 1302 are considered symmetric cores, i.e. cores with the same configurations, functional units, and/or logic. In another embodiment, core 1301 includes an out-of-order processor core, while core 1302 includes an in-order processor core. However, cores 1301 and 1302 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1301 are described in further detail below, as the units in core 1302 operate in a similar manner in the depicted embodiment.

As depicted, core 1301 includes two hardware threads 1301a and 1301b, which may also be referred to as hardware thread slots 1301a and 1301b. Therefore, software entities, such as an operating system, in one embodiment potentially view processor 1300 as four separate processors, i.e., four logical processors or processing elements capable of executing four software threads concurrently. As alluded to above, a first thread is associated with architecture state registers 1301a, a second thread is associated with architecture state registers 1301b, a third thread may be associated with architecture state registers 1302a, and a fourth thread may be associated with architecture state registers 1302b. Here, each of the architecture state registers (1301a, 1301b, 1302a, and 1302b) may be referred to as processing elements, thread slots, or thread units, as described above. As illustrated, architecture state registers 1301a are replicated in architecture state registers 1301b, so individual architecture states/contexts are capable of being stored for logical processor 1301a and logical processor 1301b. In core 1301, other smaller resources, such as instruction pointers and renaming logic in allocator and renamer block 1330 may also be replicated for threads 1301a and 1301b. Some resources, such as re-order buffers in reorder/retirement unit 1335, ILTB 1320, load/store buffers, and queues may be shared through partitioning. Other resources, such as general purpose internal registers, page-table base register(s), low-level data-cache and data-TLB 1315, execution unit(s) 1340, and portions of out-of-order unit 1335 are potentially fully shared.

Processor 1300 often includes other resources, which may be fully shared, shared through partitioning, or dedicated by/to processing elements. In FIG. 13, an embodiment of a purely exemplary processor with illustrative logical units/resources of a processor is illustrated. Note that a processor may include, or omit, any of these functional units, as well as include any other known functional units, logic, or firmware not depicted. As illustrated, core 1301 includes a simplified, representative out-of-order (OOO) processor core. But an in-order processor may be utilized in different embodiments. The OOO core includes a branch target buffer 1320 to predict branches to be executed/taken and an instruction-translation buffer (I-TLB) 1320 to store address translation entries for instructions.

Core 1301 further includes decode module 1325 coupled to fetch unit 1320 to decode fetched elements. Fetch logic, in one embodiment, includes individual sequencers associated with thread slots 1301a, 1301b, respectively. Usually core 1301 is associated with a first ISA, which defines/specifies instructions executable on processor 1300. Often machine code instructions that are part of the first ISA include a portion of the instruction (referred to as an opcode), which references/specifies an instruction or operation to be performed. Decode logic 1325 includes circuitry that recognizes these instructions from their opcodes and passes the decoded instructions on in the pipeline for processing as defined by the first ISA. For example, as discussed in more detail below decoders 1325, in one embodiment, include logic designed or adapted to recognize specific instructions, such as transactional instruction. As a result of the recognition by decoders 1325, the architecture or core 1301 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1326, in one embodiment, recognize the same ISA (or a subset thereof). Alternatively, in a heterogeneous core environment, decoders 1326 recognize a second ISA (either a subset of the first ISA or a distinct ISA).

In one example, allocator and renamer block 1330 includes an allocator to reserve resources, such as register files to store instruction processing results. However, threads 1301a and 1301b are potentially capable of out-of-order execution, where allocator and renamer block 1330 also reserves other resources, such as reorder buffers to track instruction results. Unit 1330 may also include a register renamer to rename program/instruction reference registers to other registers internal to processor 1300. Reorder/retirement unit 1335 includes components, such as the reorder buffers mentioned above, load buffers, and store buffers, to support out-of-order execution and later in-order retirement of instructions executed out-of-order.

Scheduler and execution unit(s) block 1340, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1350 are coupled to execution unit(s) 1340. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1301 and 1302 share access to higher-level or further-out cache, such as a second level cache associated with on-chip interface 1310. Note that higher-level or further-out refers to cache levels increasing or getting further way from the execution unit(s). In one embodiment, higher-level cache is a last-level data cache—last cache in the memory hierarchy on processor 1300—such as a second or third level data cache. However, higher level cache is not so limited, as it may be associated with or include an instruction cache. A trace cache—a type of instruction cache—instead may be coupled after decoder 1325 to store recently decoded traces. Here, an instruction potentially refers to a macro-instruction (i.e. a general instruction recognized by the decoders), which may decode into a number of micro-instructions (micro-operations).

In the depicted configuration, processor 1300 also includes on-chip interface module 1310. Historically, a memory controller, which is described in more detail below, has been included in a computing system external to processor 1300. In this scenario, on-chip interface 1310 is to communicate with devices external to processor 1300, such as system memory 1375, a chipset (often including a memory controller hub to connect to memory 1375 and an I/O controller hub to connect peripheral devices), a memory controller hub, a northbridge, or other integrated circuit. And in this scenario, bus 1305 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1375 may be dedicated to processor 1300 or shared with other devices in a system. Common examples of types of memory 1375 include DRAM, SRAM, non-volatile memory (NV memory), and other known storage devices. Note that device 1380 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1300. For example in one embodiment, a memory controller hub is on the same package and/or die with processor 1300. Here, a portion of the core (an on-core portion) 1310 includes one or more controller(s) for interfacing with other devices such as memory 1375 or a graphics device 1380. The configuration including an interconnect and controllers for interfacing with such devices is often referred to as an on-core (or un-core configuration). As an example, on-chip interface 1310 includes a ring interconnect for on-chip communication and a high-speed serial point-to-point link 1305 for off-chip communication. Yet, in the SOC environment, even more devices, such as the network interface, co-processors, memory 1375, graphics processor 1380, and any other known computer devices/interface may be integrated on a single die or integrated circuit to provide small form factor with high functionality and low power consumption.

In one embodiment, processor 1300 is capable of executing a compiler, optimization, and/or translator code 1377 to compile, translate, and/or optimize application code 1376 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 14:
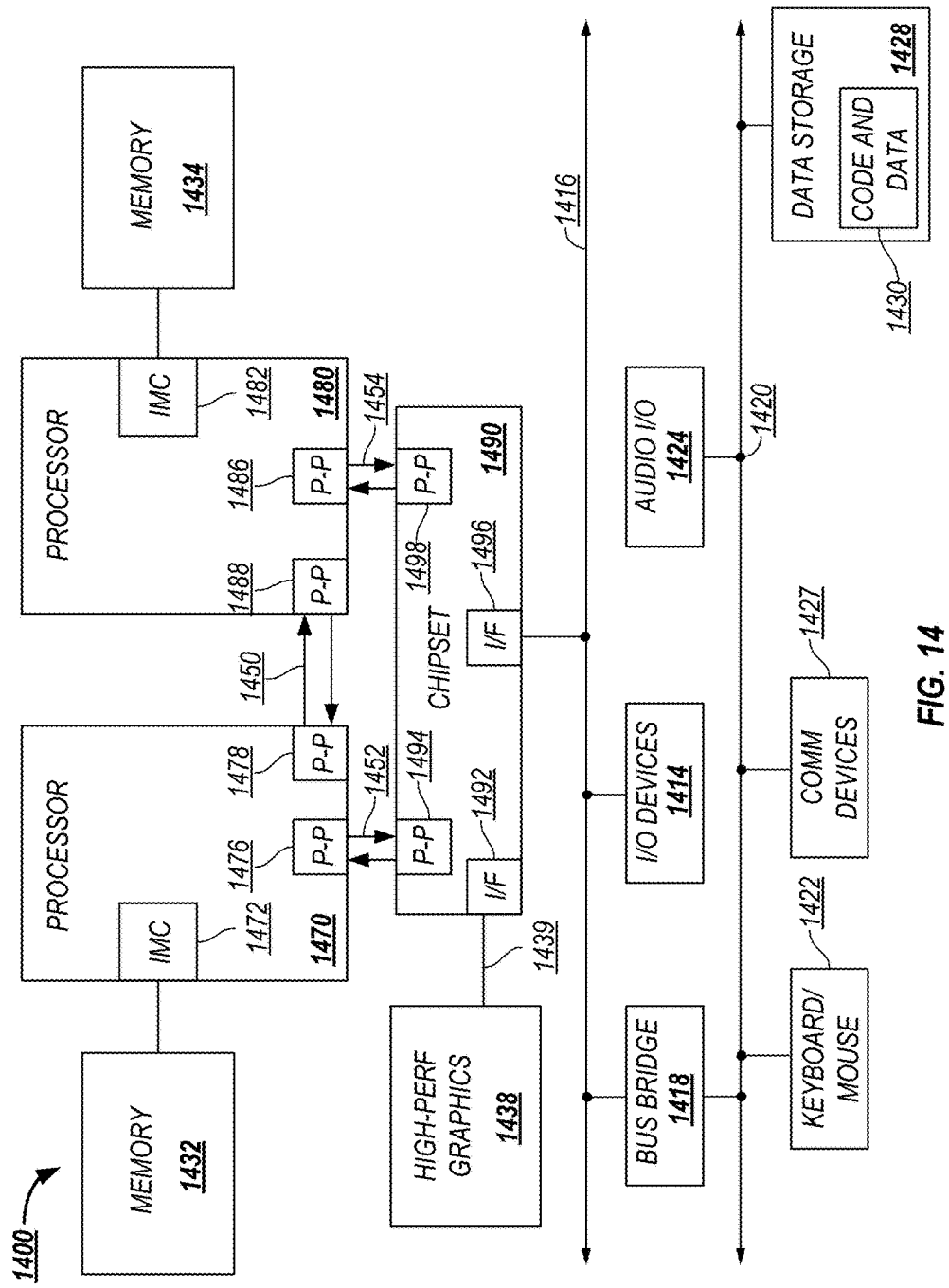
FIG. 14 illustrates an embodiment of a block for a computing system including multiple processors.

Referring now to FIG. 14, shown is a block diagram of a second system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of a processor. In one embodiment, 1452 and 1454 are part of a serial, point-to-point coherent interconnect fabric, such as a high-performance architecture. As a result, the invention may be implemented within the QPI architecture.

While shown with only two processors 1470, 1480, it is to be understood that the scope of the present invention is not so limited. In other embodiments, one or more additional processors may be present in a given processor.

Processors 1470 and 1480 are shown including integrated memory controller units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 each exchange information with a chipset 1490 via individual P-P interfaces 1452, 1454 using point to point interface circuits 1476, 1494, 1486, 1498. Chipset 1490 also exchanges information with a high-performance graphics circuit 1438 via an interface circuit 1492 along a high-performance graphics interconnect 1439.

A shared cache (not shown) may be included in either processor or outside of both processors; yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 are coupled to first bus 1416, along with a bus bridge 1418 which couples first bus 1416 to a second bus 1420. In one embodiment, second bus 1420 includes a low pin count (LPC) bus. Various devices are coupled to second bus 1420 including, for example, a keyboard and/or mouse 1422, communication devices 1427 and a storage unit 1428 such as a disk drive or other mass storage device which often includes instructions/code and data 1430, in one embodiment. Further, an audio I/O 1424 is shown coupled to second bus 1420. Note that other architectures are possible, where the included components and interconnect architectures vary. For example, instead of the point-to-point architecture of FIG. 14, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

While the present invention has been described with respect to a limited number of embodiments, those skilled in the art will appreciate numerous modifications and variations therefrom. It is intended that the appended claims cover all such modifications and variations as fall within the true spirit and scope of this present invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a Physical layer (PHY) block;
a Media Access Control layer (MAC) block; and
a PHY/MAC interface including,
a low pin count Physical Interface for PCI Express (PIPE) interface comprising,
a small set of wires coupled between the PHY and MAC blocks;
one or more PHY PIPE registers implemented in the PHY block; and
one or more MAC PIPE registers implemented in the MAC block,
wherein the low pin count PIPE interface is configured to transfer register commands between the PHY and MAC blocks over the small set of wires in a time-multiplexed manner.

2. The apparatus of claim 1, wherein the PHY/MAC interface further includes one or more signal lines dedicated for signals with critical timing requirements that are separate from the low pin count PIPE interface.

3. The apparatus of claim 1, wherein the low pin count interface supports transmission from the PHY block to the MAC block in a first direction over a first data path and transmission from the MAC block to the PHY block in a second direction over a second data path, and each of the first and second data paths is 8-bits wide.

4. The apparatus of claim 1, wherein the register commands includes a write request comprising an address and data to be written to a PHY PIPE register.

5. The apparatus of claim 1, wherein the register commands includes a read request comprising an address of a PHY PIPE register to be read.

6. The apparatus of claim 1, wherein the register commands includes a write request comprising an address and data to be written to a MAC PIPE register.

7. The apparatus of claim 1, wherein the register commands includes a read request comprising an address of a MAC PIPE register to be read.

8. The apparatus of claim 1, wherein the low pin count interface is further configured to implement a 12-bit address space into which PHY PIPE registers and MAC PIPE registers are mapped.

9. The apparatus of claim 1, wherein the PHY block is selectively configurable to implement a PIPE architecture when operating in a PIPE mode and a serialization and deserialization (SERDES) architecture when operating in a SERDES mode.

10. The apparatus of claim 1, wherein the MAC block comprises one of a PIPE compliant MAC or a serialization and deserialization (SERDES) compliant MAC.

11. A Physical layer (PHY) chip, configured to interface with a Media Access Control layer (MAC) block, comprising:
a PHY block including circuitry to implement a Physical layer; and
a PHY/MAC interface including,
a low pin count Physical Interface for PCI Express (PIPE) interface comprising,
means for coupling the PHY block chip to a small number of wires to transmit signals to and receive signals from the MAC block; and
one or more PHY PIPE registers,
wherein the low pin count PIPE interface is configured to transfer register commands to the MAC block and receive register commands from the MAC block over the small number of wires in a time-multiplexed manner.

12. The PHY chip of claim 11, wherein the PHY/MAC interface further includes means for coupling to one or more signal lines dedicated for signals with critical timing requirements that are separate from the low pin count PIPE interface.

13. The PHY chip of claim 11, wherein the low pin count PIPE interface supports transmission of signals from the PHY block to the MAC block over a data transmission path in a first direction and reception of signals transmitted from the MAC block to the PHY block over a data reception path in a second direction, and each of the first and second data transmission path and data reception path is 8-bits wide.

14. The PHY chip of claim 11, wherein the register commands includes a write request comprising an address and data to be written to a PHY PIPE register.

15. The PHY chip of claim 11, wherein the register commands includes a read request comprising an address of a PHY PIPE register to be read.

16. The PHY chip of claim 11, wherein the MAC block includes one or more MAC PIPE registers and the register commands includes a write request comprising an address and data to be written to a MAC PIPE register.

17. The PHY chip of claim 11, wherein the MAC block includes one or more MAC PIPE registers and the register commands includes a read request comprising an address of a MAC PIPE register to be read.

18. The PHY chip of claim 11, wherein the low pin count PIPE interface is further configured to implement a 12-bit address space into which PHY PIPE registers are mapped.

19. The PHY chip of claim 11, wherein the MAC block includes one or more MAC PIPE registers and the low pin count PIPE interface is further configured to implement a 12-bit address space into which the one or more MAC PIPE registers are mapped.

20. The PHY chip of claim 11, wherein the PHY block is selectively configurable to implement a PIPE architecture when operating in a PIPE mode and a serialization and deserialization (SERDES) architecture when operating in a SERDES mode.

21. A Media Access Control layer (MAC) block, configured to interface with a Physical layer (PHY) block, comprising:
means for implementing a MAC layer; and
a PHY/MAC interface including,
a low pin count Physical Interface for PCI Express (PIPE) interface comprising,
means for coupling the MAC block to a small number of wires to transmit signals to and receive signals from the PHY block; and
one or more MAC PIPE registers,
wherein the low pin count PIPE interface is configured to transfer register commands to the PHY block and receive register commands from the PHY block over the small number of wires in a time-multiplexed manner.

22. The MAC block of claim 21, wherein the PHY/MAC interface further includes means for coupling to one or more signal lines dedicated for signals with critical timing requirements that are separate from the low pin count PIPE interface.

23. The MAC block of claim 21, wherein the low pin count PIPE interface supports transmission of signals from the MAC block to the PHY block over a data transmission path in a first direction and reception of signals transmitted from the PHY block to the MAC block over a data reception path in a second direction, and each of the first and second data transmission path and data reception path is 8-bits wide.

24. The MAC block of claim 21, wherein the register commands includes a write request comprising an address and data to be written to a MAC PIPE register.

25. The MAC block of claim 21, wherein the register commands includes a read request comprising an address of a MAC PIPE register to be read.

26. The MAC block of claim 21, wherein the PHY block includes one or more PHY PIPE registers and the register commands includes a write request comprising an address and data to be written to a PHY PIPE register.

27. The MAC block of claim 21, wherein the PHY block includes one or more PHY PIPE registers and the register commands includes a read request comprising an address of a PHY PIPE register to be read.

28. The MAC block of claim 21, wherein the low pin count PIPE interface is further configured to implement a 12-bit address space into which MAC PIPE registers are mapped.

29. The MAC block of claim 21, wherein the PHY block includes one or more PHY PIPE registers and the low pin count PIPE interface is further configured to implement a 12-bit address space into which the one or more PHY PIPE registers are mapped.

30. The MAC block of claim 21, wherein the PHY block is selectively configurable to implement a PIPE architecture when operating in a PIPE mode and a serialization and deserialization (SERDES) architecture when operating in a SERDES mode.

* * * * *